May 8, 1962 E. L. STEIN 3,032,906
FLASHING REFLECTIVE DISPLAY
Filed June 24, 1959 3 Sheets-Sheet 2
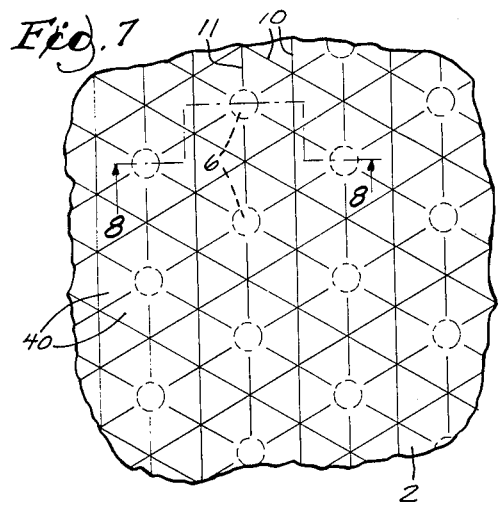
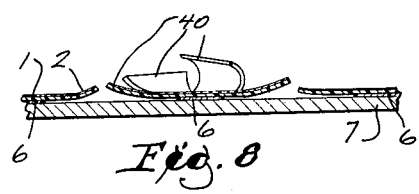
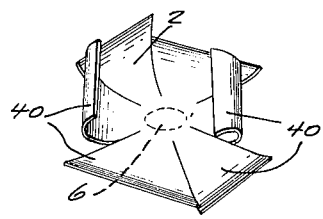
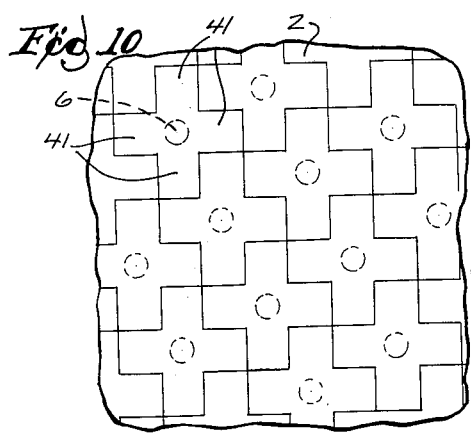
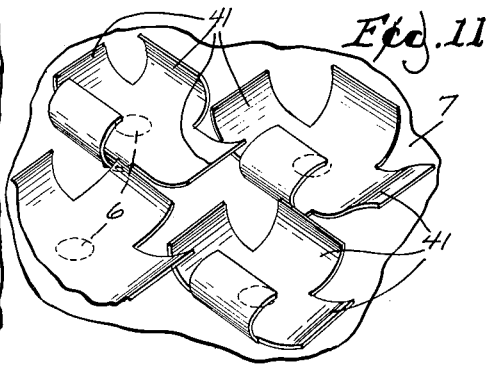
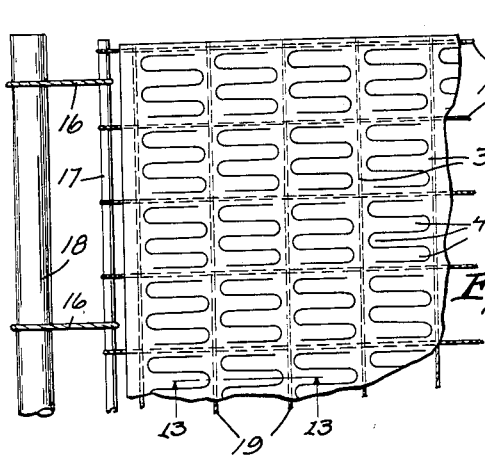
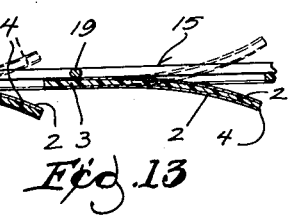
INVENTOR.
ELMER L. STEIN
BY
ATTORNEYS

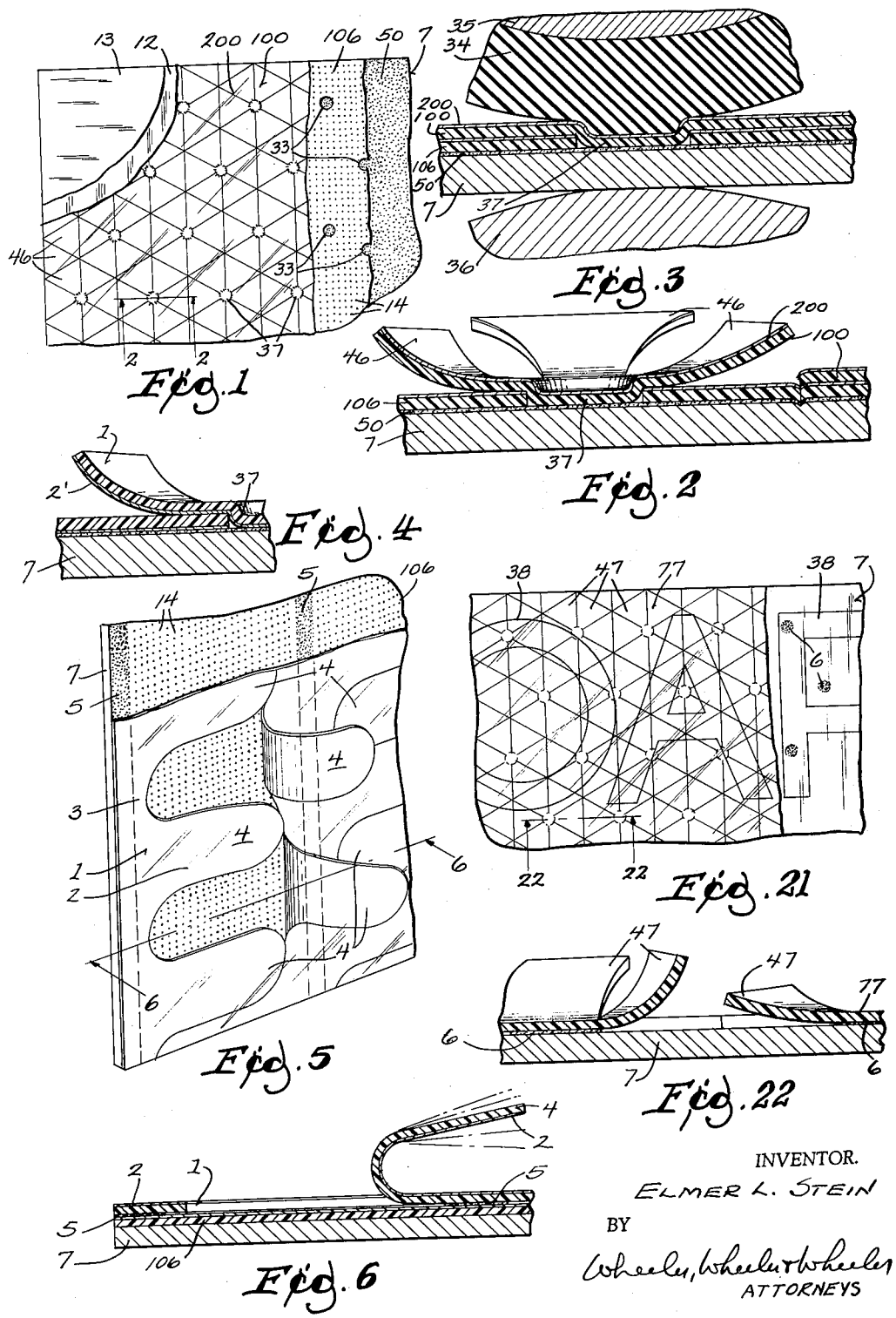

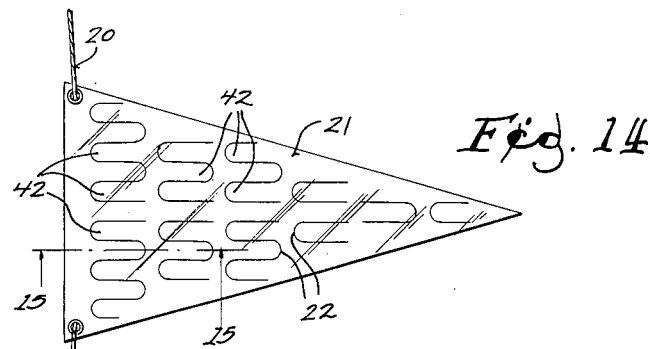
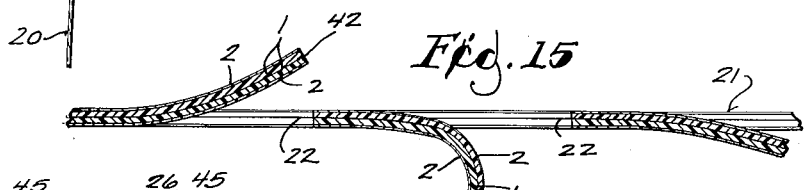
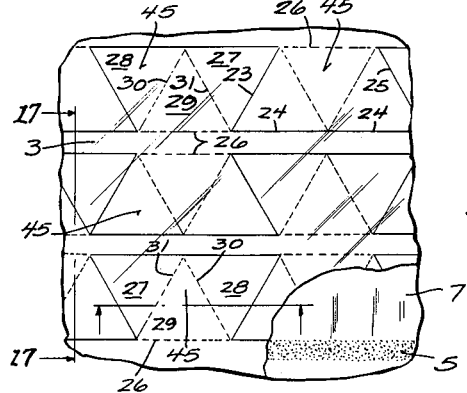
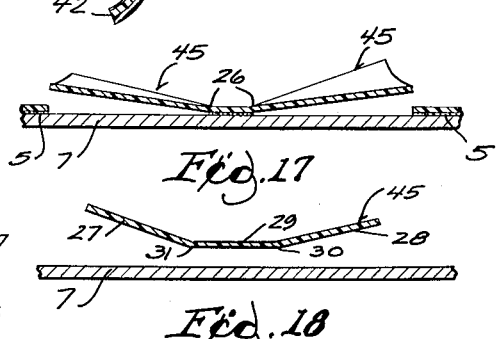
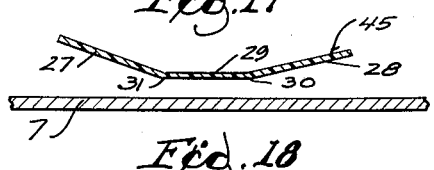
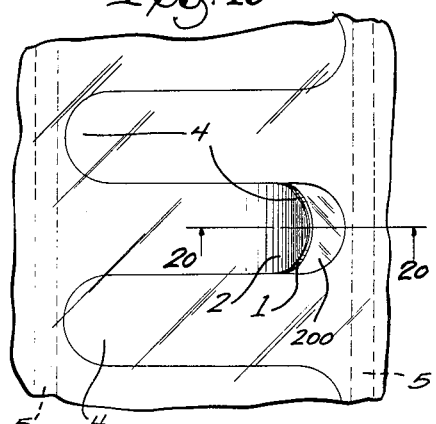
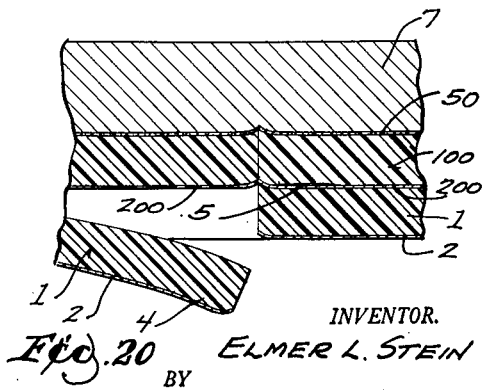

United States Patent Office 3,032,906
Patented May 8, 1962

3,032,906
FLASHING REFLECTIVE DISPLAY
Elmer L. Stein, Milwaukee, Wis., assignor, by direct and mesne assignments, to Vibrite Corporation, Milwaukee, Wis., a corporation of Wisconsin
Filed June 24, 1959, Ser. No. 822,638
22 Claims. (Cl. 40—138)

This invention relates to a flashing reflective display. It comprises a specular flexible material having relatively movable portions which are very sensitive to air currents.

The material may be a paper, a metallic foil or, as is preferred, a film of synthetic resin. It may be transparent, translucent or opaque; it may be clear or colored; it may be highly or only slightly light-reflecting. It will desirably, but not necessarily, have a metallic coating. If the material is transparent, the metallic coating may be on its rear face or its exposed face. If it is non-transparent, the reflective coating will ordinarily be on its forward face only. Under some circumstances, the partial reflection of the smooth surface of a transparent film is relied upon to produce the flashing effect while at the same time permitting the display through the semi-reflecting film of a display printed upon a backing behind it. If the surface is smoothly polished or otherwise light-reflecting, the relative movement between various portions under the influence of air currents or as the result of vibration will create a flashing effect.

Whatever material is used, it desirably is very highly flexible while, at the same time, it desirably has sufficient resilient stiffness to tend to return to its original position or form after the cessation of the air current or inertial displacement which has caused its fluttering movement.

The material preferably used is known commercially as Mylar. It is a film of synthetic resin upon which a metal coating has been deposited, preferably by condensation of metal vapor. The preferred metal is aluminum. The film and its reflective coating are desirably die cut to separate tongues or projections which are then left free when base portions of the sheet are attached to a support. The free ends of the projections flutter in currents of air or as the result of inertia when the sheet as a whole is vibrated, so that the light reflected from the coatings thereon appears to flash.

In the various embodiments herein disclosed, there are various ways of mounting the reflecting material to provide the desired result. In some instances double coated thin flexible projections are left free to flex in either direction from the plane of the mounting or base portions of the film. In other instances the film is attached to a mounting ply to which it is secured by tongues or strips of adhesive, both plies being passed together through die cutting equipment which forms the tongues or projections, the backing ply being thereupon laminated adhesively throughout its area to a relatively heavy supporting web so that even though portions of it have been separated by the die cutting operation, these remain fixed beneath the fluttering tongues or projections of the exposed ply. In other instances the underlying ply is made of dyed or otherwise colored transparent or translucent material, and in still other instances the underlying ply is also reflectively coated.

Desirably an intermediate web of material is used between the film which provides the flexible, light-reflecting tongues and the web which provides the backing, the intermediate web having apertures through which the specular film is adhered to the backing, the tongues desirably radiating from the areas in which the adhesive connection is made between the specular film and the backing web. Desirably, also, the intermediate web is embossed to reduce adhesions to the backing web, particularly when the material is designed for use out-of-doors.

It has been found that if the specular film comes into intimate face contact with backings of certain types, notably smooth and non-absorbent materials, while wet (as by rain), there is a surface tension adhesion which lasts indefinitely to preclude the fluttering effect desired.

A further feature in the preferred embodiments herein illustrated includes the protection of a sheet or panel of material embodying the invention with a slip sheet which desirably comprises thin paper laminated to any plastic sheet which manifests considerable static attraction, such as polyethylene synthetic resin. The slip sheet will adhere electrostatically to the compounded web or panel not only for its protection en route to the customer but to enable the customer to draw with a pen, pencil, or crayon on the exposed paper sheet any desired letter, symbol or design which it may be desired to use in an advertising display. The letter, symbol or design may then be cut from the composite web or panel embodying the invention and only thereafter will the slip sheet be stripped from the display symbol or letter.

The details will appear more particularly from the following disclosure with reference to the accompanying drawings.

FIG. 1 is a plan view fragmentarily illustrating the composite sheet or panel of display material embodying the invention as the same appears with a slip sheet laminated to it for its protection at the time of sale, portions being broken away to expose the underlying layers.

FIG. 2 is a greatly enlarged detail view taken in section on the line 2—2 of FIG. 1.

FIG. 3 is a fragmentary detail view diagrammatically illustrating the manufacturing procedure, rolls being fragmentarily illustrated.

FIG. 4 is a view similar to FIG. 2 showing a modified embodiment of the invention.

FIG. 5 is a fragmentary detail view in perspective showing a further modified embodiment of the invention.

FIG. 6 is a detail view taken in section on the line 6—6 of FIG. 5.

FIG. 7 is a plan view on an enlarged scale showing a modified pattern for a device otherwise similar to that of FIG. 1.

FIG. 8 is an enlarged detail view in cross section on the line 8—8 of FIG. 7.

FIG. 9 is an enlarged detail view in perspective of a single reflective unit such as is used in the device of FIGS. 7 and 8.

FIG. 10 is a view similar to FIG. 7 showing a further modified pattern.

FIG. 11 is a view in perspective showing on an enlarged scale component units of the pattern of FIG. 10, the backing member being fragmentarily illustrated.

FIG. 12 is a view in side elevation of a modified mounting for reflecting material of the type herein disclosed.

FIG. 13 is an enlarged detail view taken in section on the line 13—13 of FIG. 12.

FIG. 14 is a view in side elevation showing a modified embodiment of the invention.

FIG. 15 is a greatly enlarged detail view taken in section on the line 15—15 of FIG. 14.

FIG. 16 is a view similar to FIG. 7 showing a further modified pattern for material embodying the invention, portions of the reflectively coated ply being broken away.

FIG. 17 is an enlarged detail view taken in section on the line 17—17 of FIG. 16.

FIG. 18 is an enlarged detail view taken in section on the line 18—18 of FIG. 16.

FIG. 19 is a fragmentary detail view in plan showing a portion of a modified embodiment of the invention in which the surface ply having a reflective coating and yieldably flexible tongues is underlaid by a relatively stationary ply having a reflective coating.

FIG. 20 is a very much enlarged detail view taken in section on the line 20—20 of FIG. 19.

FIG. 21 is a modified embodiment of the invention, portions being broken away.

FIG. 22 is an enlarged fragmentary detail view taken in section on the line 22—22 of FIG. 21.

In its simplest form, the invention comprises a very thin and highly flexible film 1 of synthetic resin with a metallic reflective coating at 2 which is continuous across the relatively fixed base portions 3 and partially severed tongues 4 or 40, which may be cut by a die, or otherwise, from the base portions 3 with respect to which the integral tongues 4 have relative movement. It is broadly immaterial whether the movement is a movement of the tongues, such as may be induced by air currents, or whether the movement is a vibratory movement of the base portions 3, the tongues tending by their inertia to remain relatively stationary, whereby the relative movement occurs. The base portions are desirably united by adhesive strips 5 or dots 6 to a backing member 7 whereby the base portions of the film are held fixed while the semi-detached tongues or other projections 4 are left free to flutter in response to air currents.

When the film 1 is not transparent, the reflective coating 2 will ordinarily be on its face. If the film is transparent, the reflective coating 2 may be on its face or there may be a coating 2' on the adverse side as shown in FIG. 4. Whenever a metallic reflective coating is used, it is preferred to protect it against oxidation or other corrosion by applying, by spraying or otherwise, an acrylic resin or the like as indicated at 2'. As distinguished from the film 1 of synthetic resin, which is self-supporting, the layer 2' is like a transparent varnish.

Instead of attaching the film directly to the backing member 7, an additional film or other web may intervene. In FIGS. 1 to 3, a heavy intermediate ply 106 is adhesively laminated to backing ply 7 by means of an adhesive coating 50. There are apertures 33 in the intermediate ply through which the adhesive coating 50 of the backing ply 7 is exposed.

The flexible film 100 with its coating 200 is then pressed onto the backing ply 106, as by the resiliently yieldable surface 34 of press roll 35, the backing web 7 being supported by the companion press roll 36. This or any other suitable means is employed to offset the portion 37 of the film 100 into the aperture 33 in order that the film may be adhered to the adhesive 50 where the adhesive is exposed in the aperture. Either before or after this laminating operation is performed, the tongues 46 are partially severed. Due to the relative thickness of the intermediate ply 106, the material will tend to be puckered slightly as shown at 37 in FIGS. 1 and 2.

Reflective material from which innumerable projections or tongues are flexibly supported may be used in sheets as in FIG. 1 or cut into symbols. Not only to protect material pending delivery to the customer but also to protect it during the cutting of symbols therefrom, and to facilitate laying out the symbols, a multi-ply slip sheet is desirably applied over the entire area of the sheet or panel embodying the invention. This slip sheet may conveniently comprise a polyethylene film 12 laminated to a thin web 13 of paper. The polyethylene film tends to cling electrostatically to the exposed surface of the die cut film 1, to cover and hold flat the flexible tongues 4. The desired symbol can be laid out on the exposed paper ply and the several plies can then be cut with shears to the indicated outline. Thereafter the slip sheet can be stripped from the die cut film 1, leaving the tongues free for the fluttering movement which creates the scintillating effect.

To preclude molecular adhesion between the rear faces of the partially severed tongues 4 and the intermediate ply 106, the latter is desirably embossed throughout its area with minute outward protuberances 14 to break up the continuity of its otherwise smooth surface and thus to prevent the tongues from continuous face contact with this intermediate strip. In constructions in which the intermediate strip is omitted, and in which the backing member 7 has a smooth surface, the continuity of such surface is desirably broken up in some similar manner.

FIGS. 7 to 9 show a construction in which, as in FIGS. 1 to 4, the cuts 10 are made on a hexagonal pattern, the glue spots 6 being at the center of each hexagon and die cut lines 11 extending radially from the glue spots into each angle of the hexagon. The tongues 40 which result are generally triangular as clearly appears in FIG. 9, and they radiate from the glue spots 6 so that their respective reflective coatings 2 produce a multiplicity of scintillating flashes. Since the tongues are flexible in so many directions and in response to the lightest current of air, the effect is very brilliant.

FIG. 10 and FIG. 11 show a similar pattern except that it is cruciform, each cross comprising four tongues 41 and being anchored by a glue spot 6 at its center. This arrangement also produces brilliant scintillating effects as the various tongues respond to air currents in various directions as indicated in FIG. 11.

FIG. 12 shows a large mesh screen 15 stretched by ties 16 and bars 17 between posts such as that shown at 18. Here the mesh of the screen is desirably big enough so that the individual upright strands 19 of the screen extend along the relatively fixed base portions 3 of the material, leaving the tongues 4 free to flex in both directions from the plane of the screen, thus increasing the angularity through which the tongues are movable. Here both sides of the film have been provided with the reflective metallic coatings 2, but this is optional.

In the construction shown in FIG. 14, the halliards 20 support a pennant 21 made of the double coated plastic film. In this instance two single coated plies of the film 1 are laminated together for added strength. However, a pennant made as disclosed in FIG. 14 has surprising strength despite the lack of any supporting screen such as that shown in FIG. 12, the reason being that the openings formed at 22 by the partial severance of the tongues 42 relieve the air pressure from one side of the pennant to the other and permit the relatively movable parts of the composite laminated web to move about freely without damage.

FIGS. 16 to 18 disclose another pattern in which the reflectively coated film of synthetic resin may be cut to advantage. In this embodiment, trapezoidal tongues 45 are cut from the reflectively coated film 1, the base portions of which are attached, as by strips of adhesive 5 to the backing ply 7. Desirably, though not necessarily, these lines of adhesive are horizontal in this particular construction. Each trapezoidal tongue is severed along the divergent solid lines 23, 24 and 25 from adjacent base portions 3 and tongues 45. Each tongue 45 is then slightly folded up from the base portion 3 to which it is attached along the score line 26. Triangular areas 27 and 28 of each tongue are then folded upwardly respecting area 29 thereof on fold lines delineated by reference characters 30 and 31 respectively. Here again such a wide variety of angles is presented and so many reflective surfaces are relatively movable as to give a brilliant scintillating effect.

It is possible, as above suggested, to mount one of the transparent synthetic resinous films on another and to die cut them both concurrently, attaching the rearmost film throughout its arms to a backing ply 7 of cardboard or the like, while the exposed reflectively coated film is attached to its supporting ply only at its base portions, leaving its flexible tongue portions free. Such an arrangement is shown in FIGS. 19 and 20 in which, however, I have also illustrated an additional feature. In FIG. 19 and FIG. 20, the outer film 1 with its reflective coating 2 is the same as described above, with particular reference to FIGS. 1 to 3 and 6. The backing board 7 of cardboard or metal or plastic, paper, or glass may also be identical with that already described.

The outer film 1 has the tongues in any desired pattern partially severed and free to respond to air currents as already described. The only difference lies in the fact that the film 1, instead of being attached directly to the backing web 7, is attached by spots or strips of adhesive as at 5 to an intermediate ply 100 of the resin film, which has a continuous adhesive connection at 50 with the backing web 7. In a preferred embodiment of the invention, the intermediate film ply 100 has a reflective coating 200 of its own, similar to that of the outer ply 1, so that as any tongues of the outer ply are blown about in the manner disclosed in FIGS. 2–6, 8 or 15, the underlying coating 200 of the intermediate ply 100 will be exposed to produce its own effect. It may, if desired, be colored in order to differentiate its effect from that of the reflective coating 2 of the outer ply.

In the construction shown in FIGS. 21 and 22, the same tongue-forming pattern is illustrated, merely by way of exemplification. Here the film 77 is only partially reflective and is otherwise transparent. Any desired pictures or printing, such as the symbols 38, can be printed on a backing sheet 7 where they will be quite clearly visible through the transparent film 77, notwithstanding that there is a certain amount of light reflection from the surface of the film. The tongues 47, regardless of the pattern in which they are cut will flutter in even the lightest air current in the manner already described, creating the visual impression of moving lights, but without interfering with the legibility of the pictures of symbols or scenes overlaid by the film.

Materials made in accordance with the present invention may be attached to other signs or may comprise signs in and of themselves or may be used simply as attention focusing accents, as in devices used for this purpose in and about filling stations. Wherever used, they inevitably attract attention, as the films are so light and flexible as to respond to the slightest air movement or vibration and thus create a multitude of brilliant flashes throughout the area in which flexible tongues are provided. Yet the film is very strong and will stand up under long periods of exposure out of doors. Since both the film and the coatings are waterproof and relatively free of damage by light, materials and devices made in accordance herewith have long life.

While reference is made herein to the preferred use of Mylar—a commercially available product—as a substance from which the materials and displays herein disclosed can be produced, I do not desire to limit myself to any particular substance or substances. The film or web can be any material sufficiently flexible so that projections struck therefrom will move freely in response to air currents or vibration and sufficiently resilient to have at least a tendency to resume its original form. The resilience should not be sufficient to impair the characteristic capacity of the thin film to respond freely to the actuating impulse. A sufficiently thin film of almost any synthetic resin will be found ideally adapted for these purposes.

While the reflective coating desirably comprises aluminum, I do not wish to be limited in this respect. As above noted, there is a very substantial measure of reflection from the surface of a transparent film of synthetic resin, without any specular coating whatever. If a coating is used, I do not wish to be limited to any particular mode of application of the coating to the web or film. On the contrary, in the broader aspects of this invention, I desire to include any flexible web or film having reflective tongues freely yieldable in response to air currents.

It is further to be understood that the various constructions shown in the drawings are selected by way of exemplification. Not only are different tongue arrangements possible, but it is desired that the various features disclosed be regarded as interchangeable, whereby any disposition of tongues may be mounted in any of the various ways herein disclosed and may be transparent, translucent or opaque, as desired, having reflective surfaces on their faces or their backs in accordance with the requirements of the particular case, the backing web being reflective or non-reflective, as is appropriate for the particular usage and non-oxydizing varnishes or lacquers being applied over metallic reflective coatings wherever needed.

I claim:

1. As a new article of manufacture, a scintillating display comprising a web having a surface from which a multiplicity of thin and highly flexible projections extend, said projections being distributed throughout said surface and being freely flexibly movable in response to air currents the web surface comprising a partial reflector of light, the web being transparent and having a mounting visible through said web.

2. As a new article of manufacture, a scintillating display comprising a thin and highly flexible web having a specular coating and having distributed throughout its area integral tongues having base portions attached to said web and having free end portions highly responsive to air currents, and means for mounting said web with said tongues exposed and free for fluttering movement, the web comprising a thin film of synthetic resin.

3. As a new article of manufacture, a scintillating display comprising a web having a surface from which a multiplicity of thin and highly flexible projections extend, said projections being distributed throughout said surface and being freely flexibly movable in response to air currents and provided with a light reflecting surface, said web having mounting portions, said article including a supporting means to which said mounting portions are connected, the said projections being free of said supporting means for movement with respect thereto.

4. The article of claim 3 in which the web is puckered radially of said mounting portions.

5. The article of claim 3 in which an intermediate web provided with apertures intervenes between the supporting means and the web provided with projections, the intermediate web having apertures and the first mentioned web having its mounting portions disposed in said apertures, the projections radiating from said mounting portions.

6. The article of claim 3 in which said supporting means has an adhesive-coated surface and is provided with an intermediate web laminated to said surface and provided with apertures in which the adhesive coating is exposed, the said mounting portions being laminated to the supporting means through the apertures of the intermediate web, and the said projections of the web first mentioned radiating from said mounting portions.

7. The article of claim 3 in which the mounting means comprises another web to which said mounting portions are laminated in face contact.

8. The article of claim 3 in which the mounting means comprises an open mesh, the projections comprising tongues disposed in the openings of said mesh for free movement through the mesh to project in opposite directions from the mesh.

9. The article of claim 3 in which the supporting means comprises a web having laminar connection with the first mentioned web and provided with a reflective coating of its own.

10. The article of claim 3 in which the supporting means comprises a second web to which mounting portions of the first mentioned web are laminated and of which the reflective flexible projections of the first mentioned web are free, and a backing material to which the second web is laminated to provide support from the backing material for the first mentioned web.

11. A combination with a mounting web, of a light reflecting web having mounting portions connected with the mounting web and having a multiplicity of flexible projections with light reflecting surfaces free of the mounting web for movement with respect thereto.

12. A sign comprising the combination with a tranparent web, of a reflectively coated attention-attracting web having mounting portions attached to the transparent web and having freely flexible projections free for movement respecting the transparent web, the said projections being so flexible as to move readily in response to air currents to which they may be subject.

13. As a new article of manufacture, a flexible pennant provided with a number of openings through it, and with tongues projecting from the pennant into said openings, said tongues being flexible within the openings of the pennant and having highly reflective metallic surfaces.

14. The combination with a mounting web, of a display web having a light reflecting surface and having mounting portions in adhesive connection with the mounting web, and further having flexible tongues projecting from said mounting portions and free for movement respecting the mounting web.

15. The device of claim 14 in which the adhesive connection between the display web and the mounting web comprises a strip of adhesive substantially co-extensive with a mounting portion of the display web, the said last mentioned mounting portion of the display web being continuous past a number of said flexible projections.

16. The device of claim 14 in which the adhesive connection between the mounting web and mounting portions of the display web comprise a plurality of spots of adhesive from which flexible reflectively surfaced projections of the display web radiate in various directions.

17. The device of claim 14 in further combination with a supporting sheet to which the mounting web is substantially continuously laminated, the mounting web having projections registering with those of the display web but adhesively laminated to said supporting sheet and outside of which the reflectively coated flexible projections of the display web are movable.

18. The device of claim 17 in which the projections of the mounting web as well as those of the display web are coated with a highly reflecting material.

19. The combination with a mounting web, of a display web having a light reflecting surface and having mounting portions in adhesive connection with the mounting web, and further having flexible tongues projecting from said mounting portions and free for movement respecting the mounting web, together with a slip sheet electrostatically adhered over said display web and having a markable surface upon which a symbol may be outlined to be cut from said web and to contain a number of said tongues and from which said slip sheet may then be withdrawn to expose such tongues.

20. The combination set forth in claim 19 in which said slip sheet comprises a synthetic resin ply and a paper ply, the synthetic resin ply being electrostatically adhered to said tongues and the paper ply being exposed for marking.

21. The combination with a mounting web, of a display web having mounting portions in adhesive connection with the mounting web and further having flexible tongues with light-reflecting surfaces projecting from said mounting portions and free for movement to and from face contact with the mounting web.

22. The device of claim 21 in which the mounting web and the tongues have complementary surfaces tending to adhere when wet, at least one of said surfaces being embossed with protuberances adapted to interrupt continuity of face contact between said surfaces whereby to minimize adhesion therebetween.

References Cited in the file of this patent

UNITED STATES PATENTS

| 1,242,429 | Enochty | Oct. 9, 1917 |
| 2,351,142 | Mitchell | June 13, 1944 |

FOREIGN PATENTS

| 582,811 | France | Oct. 22, 1924 |